US008232882B2

(12) United States Patent  (10) Patent No.: US 8,232,882 B2
Miyabayashi et al.  (45) Date of Patent: Jul. 31, 2012

(54) PHOTODETECTOR USED TO CONTROL NEAR FIELD COMMUNICATION (75) Inventors: Naoki Miyabayashi, Tokyo (JP); Daisuke Itoh, Kanagawa (JP); Masahiro Sueyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 527 days.

(21) Appl. No.: 12/496,279

(22) Filed: Jul. 1, 2009

(65) Prior Publication Data
US 2010/0007504 A1  Jan. 14, 2010

(30) Foreign Application Priority Data

Jul. 9, 2008 (JP) ................. 2008-178881

(51) Int. Cl.
*G08B 21/00* (2006.01)
(52) U.S. Cl. ............. 340/600; 340/572.1; 320/107
(58) Field of Classification Search ............... 340/572.1, 340/572.4, 572.7, 600, 10.1, 636.1; 320/107, 320/137
See application file for complete search history.

(56) References Cited

U.S. PATENT DOCUMENTS
2008/0117055 A1   5/2008 Blake et al.

FOREIGN PATENT DOCUMENTS
| GB | 1168509 | 5/1969 |
| JP | 05-014978 | 1/1993 |
| JP | 2002-334305 | 11/2005 |
| JP | 2008-129498 | 5/2006 |
| WO | 0065551 | 11/2000 |

OTHER PUBLICATIONS
European Search Report mailed Oct. 13, 2010 corresponding to European Patent Appln. No. 09164885.
Japanese Office Action for corresponding JP2008-178881 issued on Apr. 13, 2010.

*Primary Examiner* — Jeffery Hofsass
(74) *Attorney, Agent, or Firm* — K&L Gates LLP (57) ABSTRACT A communication apparatus includes: an antenna; a first communication means that performs near field communication with a non-contact card via the antenna; a photodetecting means that is provided near the antenna and detects an amount of incoming light; and a near field communication control means that activates the first communication means when the amount of incoming light becomes less than a predetermined threshold value, the communication apparatus being driven by a battery.

5 Claims, 5 Drawing Sheets

PHOTODETECTOR USED TO CONTROL NEAR FIELD COMMUNICATION

CROSS REFERENCES TO RELATED APPLICATIONS

The present application claims priority to Japanese Priority Patent Application JP 2008-178881 filed in the Japan Patent Office on Jul. 9, 2008, the entire contents of which is hereby incorporated by reference.

BACKGROUND

The present application relates to a communication apparatus, and, more particularly, to a communication apparatus which performs near field communication with a non-contact card.

There has been proposed an application method that connects a television receiver (hereinafter called TV) to the Internet to allow a user to enjoy on-line shopping, which is utilized using a personal computer or the like, on the TV.

In this case, a card reader/writer (hereinafter called card R/W) which reads information from a non-contact card may be mounted in a remote controller for the TV. Then, the user needs to merely place a credit card made by a non-contact card over the remote controller to easily carry out a procedure for settlement for on-line shopping without performing an operation of entering a password, a card number and so forth.

To surely sense a non-contact card placed over the remote controller at an arbitrary timing, the card R/W needs to periodically execute a polling process of generating electromagnetic waves around to search for the non-contact card. If the polling process is performed always, the service life of the battery of the remote controller becomes shorter, making it necessary to frequently change the battery. Given that the non-contact card is driven by two alkaline batteries (capacity of 4000 mAh) and the drive voltage and drive current of the card R/W are 1.9 V and 100 mA, respectively, the battery life prolongs only $4000 \div 1.9 \doteq 21$ hours.

One solution to the problem proposed is to periodically shift the mode of the near field radio communication apparatus among three modes, an idling mode, a target operation mode and an initiator operation mode, and to permit the polling process to be performed only in the initiator operation mode (see Patent Document 1 (JP-A-2006-129498). Adapting the application described in the Patent Document 1 to the above-described TV remote controller makes it possible to shorten the time for the polling process, reduce power consumption and prolong the battery life.

SUMMARY

According to Patent Document 1, however, even if the initiator operation mode is set to 10/10 of the entire period to set the power consumption in the other operation modes to zero, the life of the battery of the remote controller merely becomes about ten times longer to be 210 hours under the foregoing conditions. This is not sufficient for the life of the battery of the TV remote controller which is generally used at present is about one to two years.

Thus, it is desirable to reduce power to be consumed in near field communication with a non-contact card.

According to one embodiment, there is provided a communication apparatus including an antenna, a first communication means that performs near field communication with a non-contact card via the antenna, a photodetecting means that is provided near the antenna and detects an amount of incoming light, and a near field communication control means that activates the first communication means when the amount of incoming light becomes less than a predetermined threshold value, the communication apparatus being driven by a battery.

The near field communication control means may be configured to stop operating the first communication means and not to activate the first communication means until the amount of incoming light exceeds the threshold value, when a predetermined time elapses without near field communication with the non-contact card after activating the first communication means.

The communication apparatus may further include a second communication means that transmits information acquired from the non-contact card to another apparatus.

The near field communication control means may be configured to activate the first communication means when receiving a predetermined activation signal from the another apparatus via the second communication means.

The photodetecting means may include a photovoltaic power generating panel to convert incoming light to power to charge the battery therewith.

According to an embodiment, the first communication means that performs near field communication with a non-contact card via the antenna is activated when the amount of incoming light becomes less than a predetermined threshold value.

According to an embodiment, near field communication with a non-contact card can be controlled. Particularly, according to an embodiment, power to be consumed in near field communication with a non-contact card can be reduced, resulting in prolongation of the battery life.

Additional features and advantages are described herein, and will be apparent from the following Detailed Description and the figures.

DETAILED DESCRIPTION

The present application is described below referring to the accompanying drawings according to an embodiment.

Figure 1:
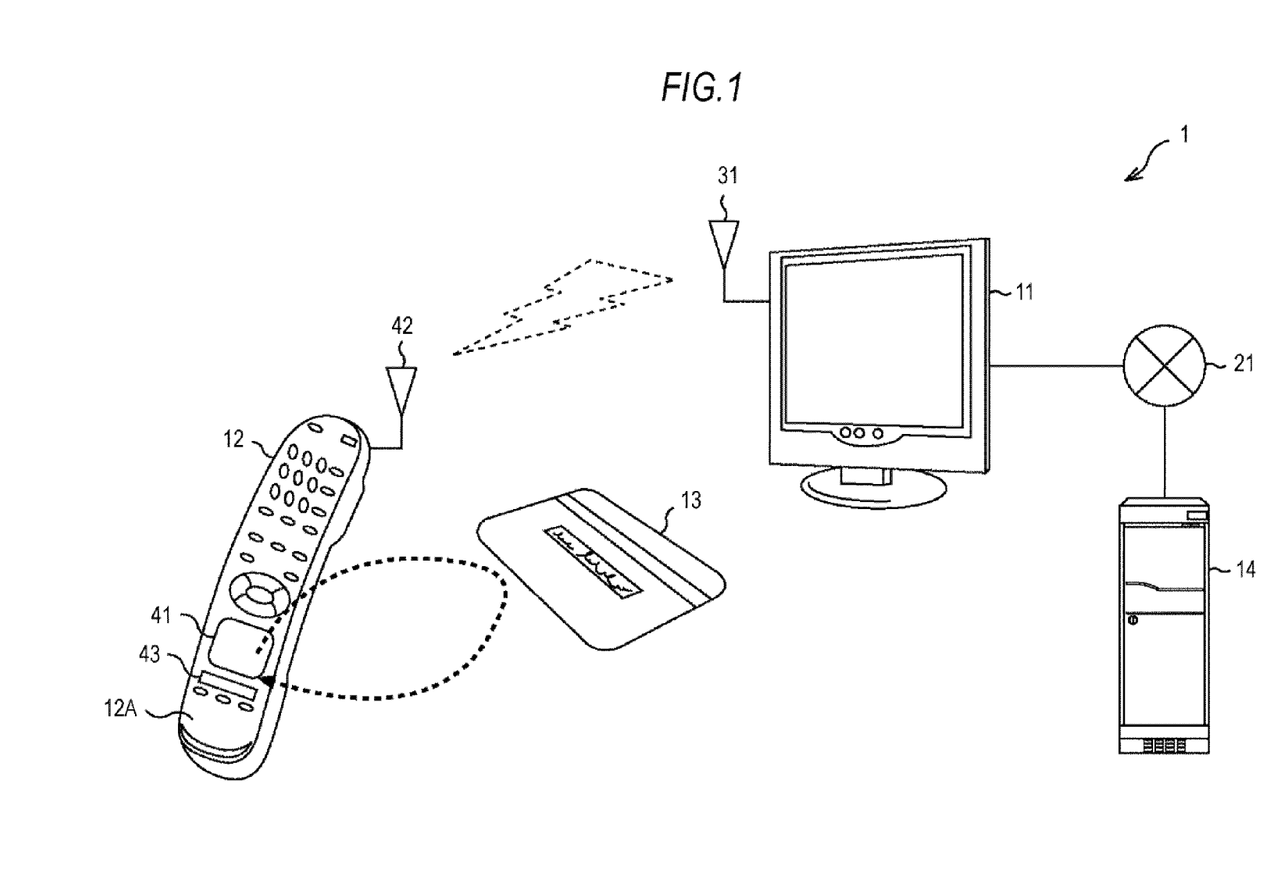
FIG. 1 is a block diagram showing one embodiment of an information processing system according to an embodiment.

FIG. 1 is a block diagram showing one embodiment of an information processing system 1 to which the present application is adapted. The information processing system 1 in FIG. 1 is configured to include a TV 11, a remote controller 12, a non-contact card 13, and a settlement server 14. The information processing system 1 can use the TV 11 to utilize services using an Internet 21, such as on-line shopping.

The TV 11 is connected to the Internet 21 to be able to communicate with another apparatus, such as the settlement server 14, over the Internet 21.

The remote controller 12 carries out bidirectional radio communication with the TV 11 via an antenna 42 and an antenna 31 of the TV 11 to remotely operate the TV 11.

The remote controller 12 incorporates a non-contact card reader/writer (R/W) section 52 (see FIG. 2) which reads or write information from or to the non-contact card 13. The remote controller 12 is provided with an antenna 41 in such a way that the receiving surface comes to an operation surface 12A having various operation keys provided thereon. As the non-contact card 13 is placed over the antenna 41, therefore, the remote controller 12 and the non-contact card 13 (non-contact card R/W section 52) perform electromagnetic-induction-based near field communication (NFC). It is to be noted that NFC means communication which is enabled when the distance between communicating apparatuses comes within several tens of cm, and includes communication in which (casings of) communicating apparatuses are in contact with each other.

Further, a photovoltaic power generating panel 43 is provided near the antenna 41 on the operation surface 12A of the remote controller 12. The photovoltaic power generating panel 43 generates power based on the incoming light, such as sunlight or illumination light, to charge a battery for driving the remote controller 12.

The non-contact card 13 is made by, for example, a non-contact type IC card which performs NFC.

The settlement server 14 communicates with the TV 11 over the Internet 21 to perform a process of settlement for on-line shopping.

The outline of the process of on-line shopping using the information processing system 1 is described below.

A user operates, for example, the remote controller 12 to select a program of on-line shopping from digital broadcast waves received by the TV 11, or access a Web site provided by an on-line shopping service over the Internet 21 to display an on-line shopping screen on the TV 11. Then, the user operates the remote controller 12 according to information in the screen to determine a commodity to be purchased.

The data portion in broadcast waves received by the TV 11 or commodity information acquired from a Web site includes information indicating the URL (Uniform Resource Locator) of the settlement server 14. When the user determines a commodity to be purchased, the TV 11 connects to the settlement server 14 over the Internet 21 based on the URL information.

When the user places the non-contact card 13 over the antenna 41 of the remote controller 12, the remote controller 12 initiates a polling process of periodically generating electromagnetic waves around to search for a communicatable non-contact card, as will be described in reference to FIG. 4. Then, communication between the remote controller 12 and the non-contact card 13 is established, so that the non-contact card 13 and the settlement server 14 become communicatable with each other via the remote controller 12, the TV 11 and the Internet 21.

The settlement server 14 performs an authentication process on the non-contact card 13 to verify that the non-contact card 13 is a reliable counterpart, then encrypts the transmission path to exchange information on a user ID, a payment amount, etc., which are needed for settlement, with the non-contact card 13. Further, the settlement server 14 performs a settlement process, such as updating balance history information in the memory of the non-contact card 13 and a database in the local server.

The user can enjoy Internet shopping using the TV 11 in this manner.

Figure 2:
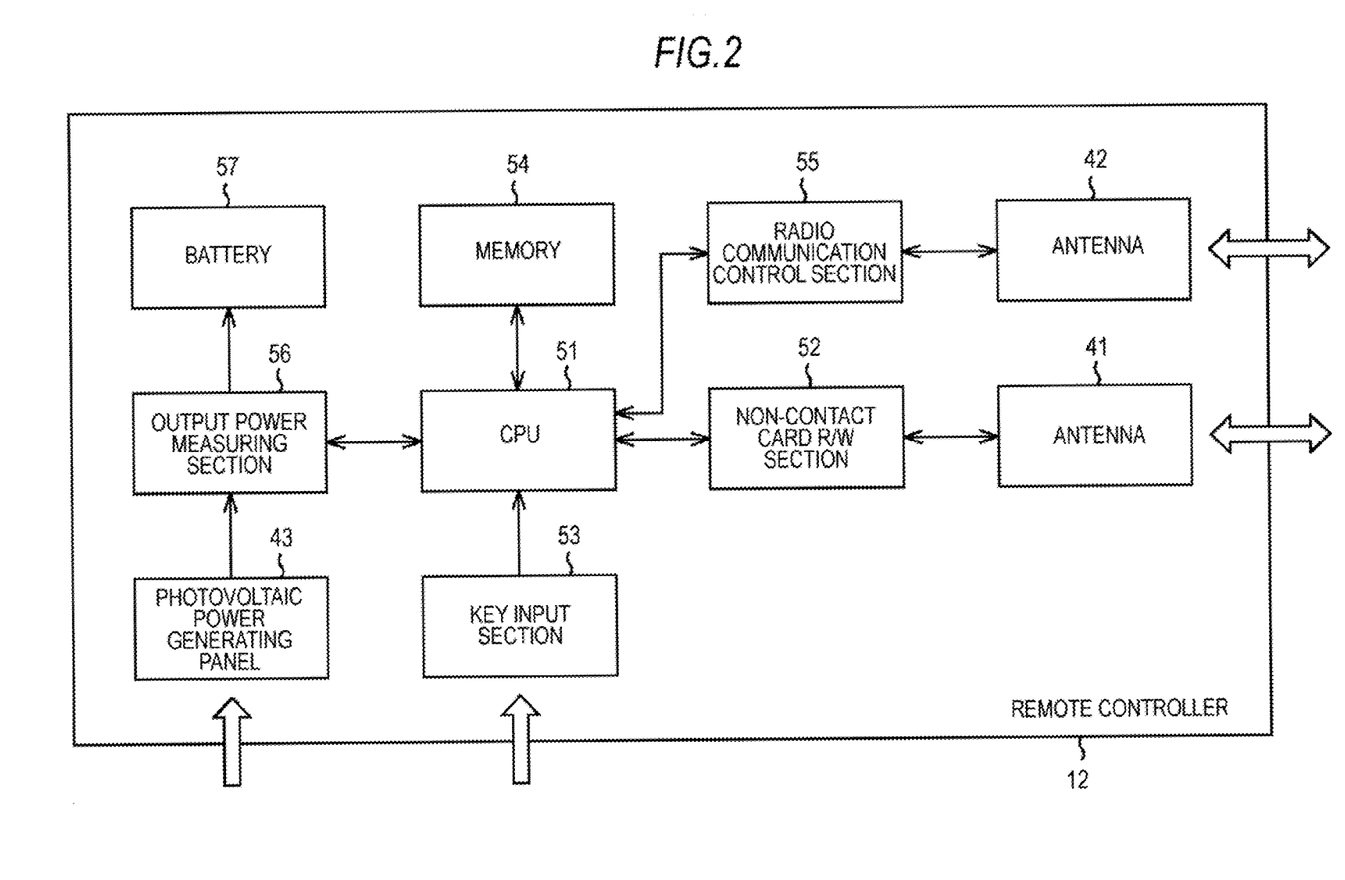
FIG. 2 is a block diagram showing the functional configuration of a remote controller.

FIG. 2 is a block diagram showing the functional configuration of the remote controller 12. The remote controller 12 is configured to have the antenna 41, the antenna 42, the photovoltaic power generating panel 43, a CPU (Central Processing Unit) 51, the non-contact card R/W section 52, a key input section 53, a memory 54, a radio communication control section 55, an output power measuring section 56, and a battery 57.

The CPU 51 executes a predetermined control program to control the individual sections of the remote controller 12.

The non-contact card R/W section 52 communicates with the non-contact card 13 via the antenna 41 to read or write information from or to the non-contact card 13 under the control of the CPU 51. The non-contact card R/W section 52 supplies the CPU 51 with the information acquired from the non-contact card 13.

NFC between the non-contact card 13 and the non-contact card R/W section 52 is carried out using the communication standard defined by, for example, ISO (International Organization for Standardization) 1443, and at a transmission rate of 424 Kbits/sec at a maximum using a carrier wave of the 13.56 MHz band.

The key input section 53 includes various keys for remotely operate the TV 11. When the user presses a key, the key input section 53 sends a signal representing a combination of two states, Low and High, according to the pressed key to a signal line connected to the CPU 51 to instruct the CPU 51 to execute an interruption process.

Upon reception of the interruption instruction, the CPU 51 searches a command table held in the memory 54 to acquire a command code corresponding to the status of the signal from the key input section 53. The CPU 51 supplies the acquired command code to the radio communication control section 55 at the subsequent stage as a payload of communication data.

The radio communication control section 55 forms the acquired payload into a packet of the format that is defined by the communication standard to which the radio communication control section 55 conforms, thus generating a base band signal. The radio communication control section 55 modulates the generated base band signal according to a predetermined system, up-converts the base band signal to have a predetermined frequency (e.g., 2.4 GHz), and then sends the resultant signal via the antenna 42. The TV 11 receives the base band signal transmitted from the remote controller 12, and performs a command process corresponding to the command code indicated by the base band signal.

The radio communication control section 55 receives an RF (Radio Frequency) signal transmitted from the TV 11 via the antenna 42, and performs down-conversion and demodulation on the RF signal to acquire a packet included in the RF signal. The radio communication control section 55 extracts a payload from the acquired packet, and supplies it to the CPU 51. The CPU 51 analyzes the acquired payload, and controls the individual sections of the remote controller 12 according to the information acquired as a consequence.

A system which ensures bidirectional radio communication with low power consumption, such as Bluetooth (Registered trademark), ZigBee (Trademark), or wireless LAN (Local Area Network) which is defined by IEEE (Institute of electrical and Electronic Engineers) 802.11 (802.11a, 802.11b, 802.11g, etc.), is adopted for communication between the TV 11 and the radio communication control section 55.

The photovoltaic power generating panel 43 converts light energy carried by incoming light, such as sunlight or illumination light, to power, and charges the battery 57 with the converted power. The remote controller 12 is driven on the power from the battery 57.

The output power measuring section 56 measures the power generated by, and output from, the photovoltaic power generating panel 43, and supplies information representing the measuring result to the CPU 51.

Next, an NFC control routine which is executed by the remote controller 12 is described below referring to a flowchart shown in FIG. 3.

In step S1, the output power measuring section 56 determines whether panel power or the output power of the photovoltaic power generating panel 43 is lower than a predetermined threshold value Wsh. The determination process in step S1 is repeated regularly until it is determined that the panel power is lower than the predetermined threshold value Wsh, and the routine proceeds to step S2 when it is determined that the panel power is lower than the predetermined threshold value Wsh.

The remote controller 12 is generally operated indoor with the operation surface 12A facing upward. In that state, light from an indoor lamp, sunlight or the like is input to the photovoltaic power generating panel 43 as exemplified at the upper left portion in FIG. 4 to effect power generation of the photovoltaic power generating panel 43 and charging of the battery 57.

Figure 4:
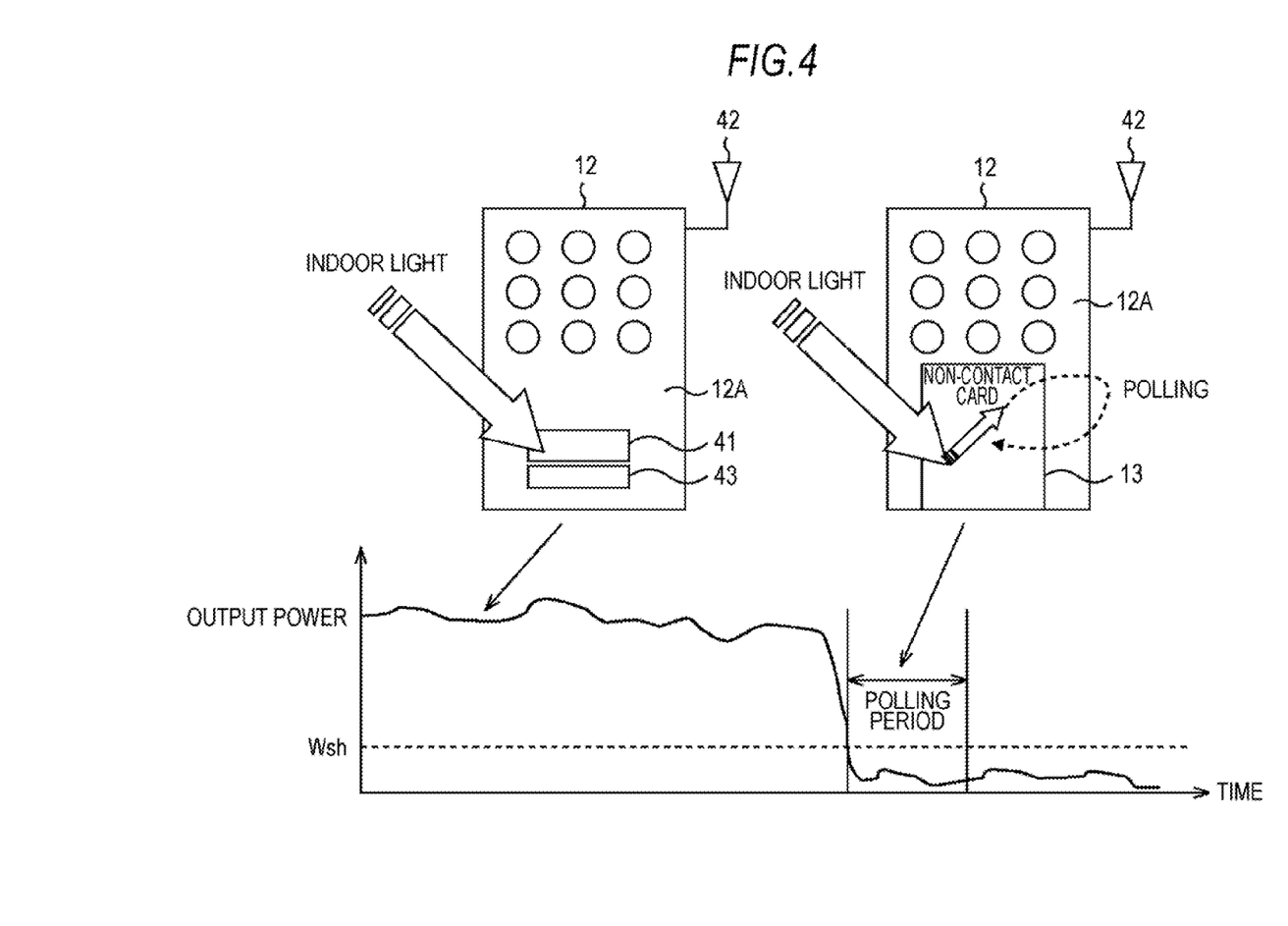
FIG. 4 is a diagram for explaining conditions for activating a non-contact card R/W section.

When the user places the non-contact card 13 over the antenna 41 as exemplified at the upper right portion in FIG. 4, on the other hand, the photovoltaic power generating panel 43 provided near the antenna 41 is also covered with the non-contact card 13. This blocks the incoming light to the photovoltaic power generating panel 43, reducing the amount of incoming light to the photovoltaic power generating panel 43 and dropping the panel power.

With the threshold value Wsh being adequate set in such a way that the panel power exceeds the threshold value Wsh in the state in the upper left portion in FIG. 4 and falls below the threshold value Wsh in the state in the upper right portion in FIG. 4, as the user places the non-contact card 13 over the antenna 41, the panel power falls below the threshold value Wsh and the routine proceeds to step S2.

In step S2, the non-contact card R/W section 52 starts the polling process. Specifically, the output power measuring section 56 notifies the CPU 51 of the panel power falling below the threshold value Wsh. The CPU 51 controls, for example, an unillustrated switch or the like to start supplying power to the non-contact card R/W section 52 from the battery 57. This activates the non-contact card R/W section 52. Further, the CPU 51 instructs the non-contact card R/W section 52 to execute the polling process, and the non-contact card R/W section 52 starts the polling process. This causes a polling signal to be periodically transmitted from the antenna 41, so that the non-contact card R/W section 52 starts searching for the non-contact card 13 in the communication range.

Upon reception of the polling signal from the remote controller 12, the non-contact card 13 transmits an acknowledge signal to the polling signal.

In step S3, the non-contact card R/W section 52 determines whether the non-contact card 13 is sensed. When the non-contact card R/W section 52 does not receive the acknowledge signal from the non-contact card 13, the non-contact card R/W section 52 determines that the non-contact card 13 is not sensed, and proceeds to step S4.

In step S4, the CPU 51 determines whether time-out has occurred. When a predetermined time has not elapsed since activation of the non-contact card R/W section 52, the CPU 51 determines that time-out has not occurred, and returns to step S3.

Thereafter, the determination processes in steps S3 and S4 are repeatedly executed until it is determined that the non-contact card 13 is sensed in step S3 or time-out has occurred in step S4.

When the non-contact card R/W section 52 receives the acknowledge signal from the non-contact card 13 via the antenna 41 in step S3, the non-contact card R/W section 52 determines that the non-contact card 13 is sensed, and proceeds to step S5.

In step S5, the non-contact card R/W section 52 performs communication with the non-contact card 13. For example, the non-contact card R/W section 52 performs communication with the non-contact card 13 via the antenna 41 to read or write information necessary for settlement for the aforementioned on-line shopping under the control of the CPU 51. Then, the communication between the non-contact card R/W section 52 and the non-contact card 13 is terminated, the routine proceeds to step S6.

When the predetermined time elapses without reception of the acknowledge signal from the non-contact card 13 since activation of the non-contact card R/W section 52 in step S4, i.e., when the predetermined time elapses without communication with the non-contact card 13, the CPU 51 determines that time-out has occurred, and proceeds to step S6.

In step S6, the CPU 51 stops operating the non-contact card R/W section 52. Specifically, the CPU 51 controls, for example, an unillustrated switch to stop supplying power to the non-contact card R/W section 52 from the battery 57, and stops operating the non-contact card R/W section 52. As the operation of the non-contact card R/W section 52 is stopped when time-out occurs as well as after communication with the non-contact card 13 is terminated, power is prevented from being wastefully consumed as a consequence of the panel power falling below threshold value Wsh and the polling process continuing due to a factor other than placement of the non-contact card 13 over the antenna 41, e.g., making the room darker or facing the operation surface 12A of the remote controller 12 downward.

In step S7, the output power measuring section 56 determines whether the panel power is greater than the threshold value Wsh. The determination process of step S7 is regularly repeated until it is determined that the panel power is greater than the threshold value Wsh. This prevents the polling process from resuming to wastefully consume power when the state of the amount of incoming light to the photovoltaic power generating panel 43 being small continues due to a factor of making the room darker, facing the operation surface 12A of the remote controller 12 downward or the like.

When it is determined in step S7 that the panel power is greater than the threshold value Wsh, on the other hand, the routine returns to step S1 and the sequence of processes starting at the step S1 is executed.

In the foregoing manner, it is possible to limit the period where the non-contact card R/W section 52 performs the polling process so that the power consumption of the remote controller 12 can be reduced. Further, even with the period of the polling process being limited, communication between the non-contact card R/W section 52 and the non-contact card 13 can be carried out reliably.

In addition, charging the battery 57 with the power from the photovoltaic power generating panel 43 can prolong the interval for replacement of the battery 57.

Figure 3:
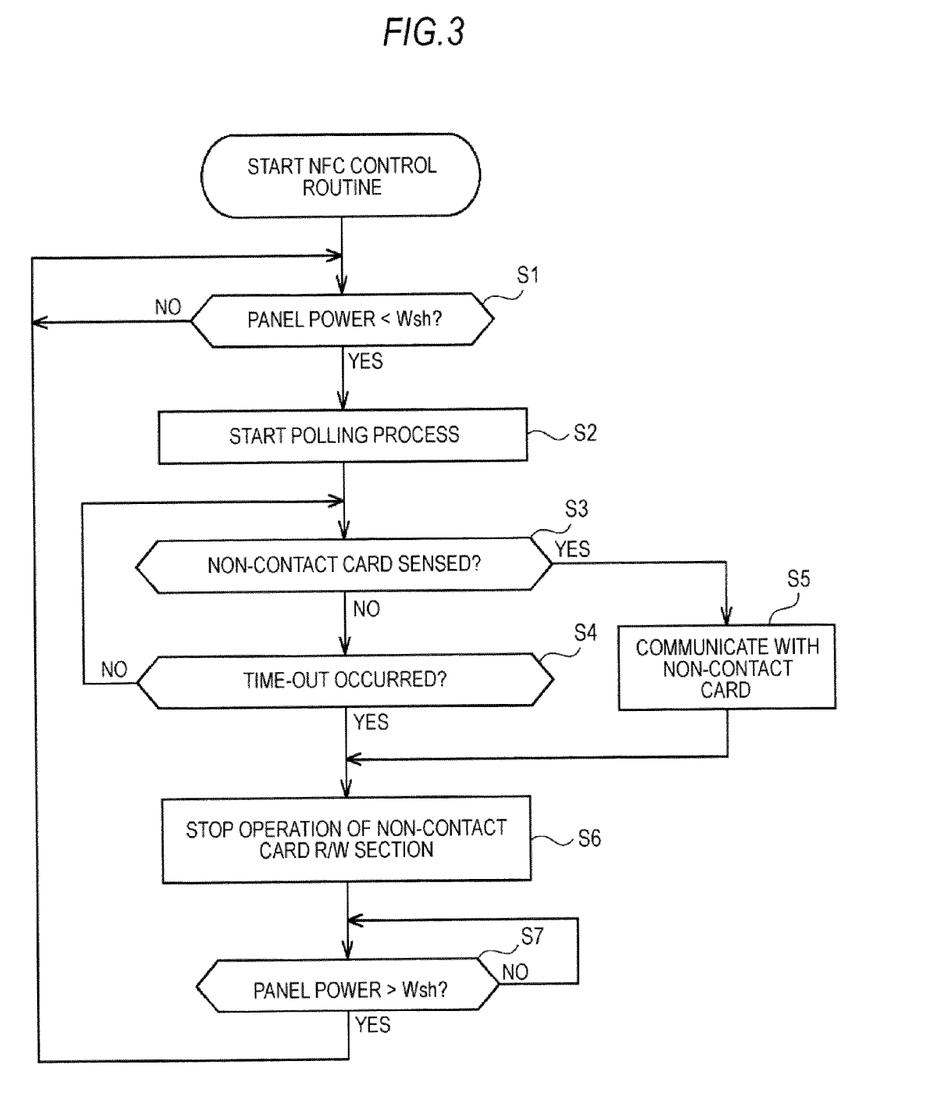
FIG. 3 is a flowchart for explaining a first embodiment of a near field communication control routine which is carried out by the remote controller.

If the user watches the TV 11 in a dark room so that the panel power does not exceed the threshold value Wsh, it is assumed in the routine shown in FIG. 3 that the polling process may not be resumed after the polling process is carried out once, disabling NFC between the remote controller 12 and the non-contact card 13.

Figure 5:
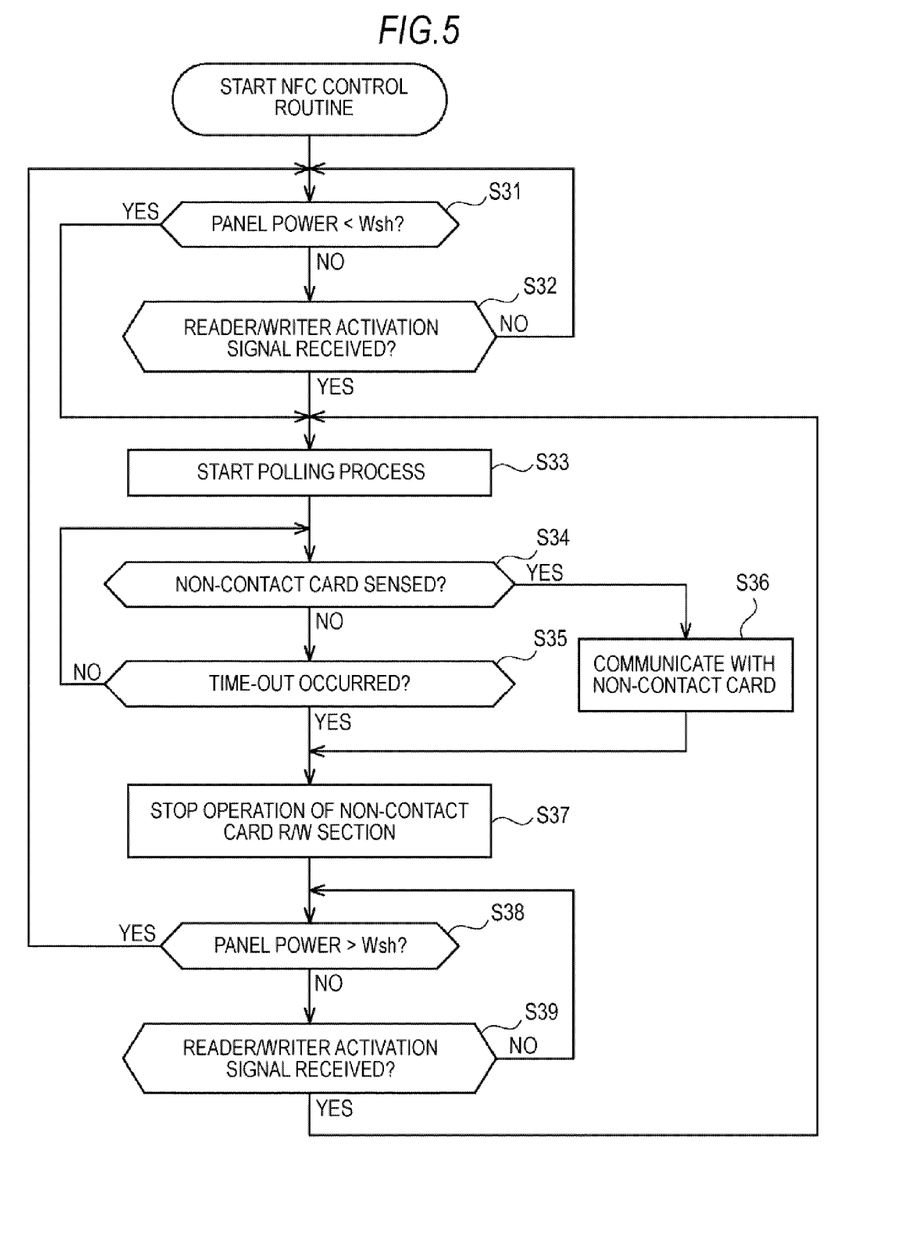
FIG. 5 is a flowchart for explaining a second embodiment of the near field communication control routine which is carried out by the remote controller.

Referring to a flowchart shown in FIG. 5, the following describes one example of a method of surely carrying out NFC between the remote controller 12 and the non-contact card 13 even in a dark room.

In step S31, it is determined whether the panel power is lower than the threshold value Wsh as in the process of step S1 in FIG. 3. When it is determined that the panel power is not lower than the threshold value Wsh, the routine proceeds to step S32.

In step S32, the radio communication control section 55 determines whether a reader/writer activation signal is received. When it is determined that the reader/writer activation signal is not received, the routine returns to step S31. The processes of steps S31 and S32 are repeatedly executed until it is determined in step S31 that the panel power is lower than the threshold value Wsh or it is determined in step S32 that the reader/writer activation signal is received.

Let us consider a case where the user utilizing on-line shopping while watching the TV 11, for example, the user operates the remote controller 12 to determine purchase of a commodity and input a command to go to the settlement process. When the TV 11 detects, while displaying the on-line shopping screen, that the user has determined purchase of a commodity and has input a command to go to the settlement process, the TV 11 transmits the reader/writer activation signal via the antenna 31.

When receiving the reader/writer activation signal via the antenna 42, the radio communication control section 55 determines in step S32 that the reader/writer activation signal is received, and the routine proceeds to step S33.

When it is determined in step S31 that the panel power is lower than the threshold value Wsh, on the other hand, the routine proceeds to step S33.

The processes of steps S33 to S37 are similar to the processes of steps S2 to S6 in FIG. 3. That is, when the polling process of the non-contact card R/W section 52 starts and the non-contact card R/W section 52 senses the non-contact card 13, communication between the non-contact card R/W section 52 and the non-contact card 13 is carried out, and the operation of the non-contact card R/W section 52 is stopped after the communication is terminated. When the non-contact card R/W section 52 cannot sense the non-contact card 13 and time-out occurs, the operation of the non-contact card R/W section 52 is stopped and the polling process is terminated.

In step S38, it is determined whether the panel power is greater than the threshold value Wsh as in the process of step S7 in FIG. 3. When it is determined that the panel power is not greater than the threshold value Wsh, the routine proceeds to step S39.

In step S39, as in the process of step S32, the radio communication control section 55 determines whether the reader/writer activation signal is received. When it is determined that the reader/writer activation signal is not received, the routine returns to step S38. Then, the processes of steps S38 and S39 are repeatedly executed until it is determined in step S38 that the panel power is greater than the threshold value Wsh or it is determined in step S39 that the reader/writer activation signal is received.

When it is determined in step S39 that the reader/writer activation signal is received, however, the routine returns to step S33 and the sequence of processes starting at the step S33 is executed. This can ensure NFC between the remote controller 12 and the non-contact card 13 even if the room is dark so that the panel power does not exceed the threshold value Wsh.

When it is determined in step S38 that the panel power is greater than the threshold value Wsh, however, the routine returns to step S31 and the sequence of processes starting at the step S31 is executed.

Accordingly, even when the user is utilizing on-line shopping while watching the TV 11 in a dark room, for example, it is possible to surely enable NFC between the remote controller 12 and the non-contact card 13 to execute settlement for on-line shopping.

The timing for transmitting the reader/writer activation signal from the TV 11 is not limited to the one in the foregoing example, and may be set to an arbitrary timing as needed.

Further, NFC being enabled between the remote controller 12 and the non-contact card 13 may be displayed on the screen of the TV 11 during the period from the transmission of the reader/writer activation signal to the occurrence of time-out.

The present application can be adapted to other applications than the above-described example. For example, there may be an application in which the remote controller 12 is triggered by the non-contact card R/W section 52 sensing the non-contact card 13 to read information stored in a free access area in the non-contact card 13 and transmit the information to the TV 11. In this case, information to be read from the free access area in the non-contact card 13 may be the history of usage of transport, the history of shopping or the like according to an embodiment.

There may also be an application in which the remote controller 12 reads URL information stored in the free access area in the non-contact card 13, transmits the read URL information to the TV 11, and instructs the TV 11 to connect to a Web site located at the URL according to an embodiment.

Although the foregoing description has been given of the example where the photovoltaic power generating panel is used to detect the amount of incoming light to the remote controller 12, a light receiving sensor which does not have a power generating capability, for example, may be used to detect the amount of incoming light.

Further, although the foregoing description has been given of the example where a single TV, remote controller, non-contact card and settlement server are provided in the information processing system 1, the quantity of each of the components may be two or greater.

While the foregoing description has been given of the example where the present application is adapted to the remote controller for a TV, the application may be adapted to other communication apparatuses which perform NFC with a non-contact card, such as a card reader/writer, a cell phone, a personal computer and a PDA (Personal Digital Assistant).

Although the foregoing description has been given of the example where a non-contact card is a counterpart that performs NFC with an communication apparatus to which the application is adapted, the counterpart may be an apparatus having a non-contact card capability (e.g., cell phone).

The above-described sequence of processes can be carried out by both hardware and software. When the sequence of processes is carried out by software, a program which achieves the software is installed from a program recording medium into a computer assembled into dedicated hardware, or a general-purpose computer which can execute various functions as various corresponding programs are installed therein.

The program that a computer executes may be a program which performs processes time-sequentially in the order explained herein, or a program which performs processes in parallel or at a timing needed, such as when the program is invoked.

The term "system" used herein means a general apparatus which includes a plurality of devices, units, or the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A communication apparatus comprising:
   an antenna;
   a first communication means that performs near field communication with a non-contact card via the antenna;
   a photodetecting means that is provided near the antenna and detects an amount of incoming light; and
   a near field communication control means that activates the first communication means when the amount of incoming light becomes less than a predetermined threshold value,
   the communication apparatus being driven by a battery; and
   wherein the photodetecting means includes a photovoltaic power generating panel to convert incoming light to power to charge the battery therewith.

2. The communication apparatus according to claim 1, wherein when a predetermined time elapses without near field communication with the non-contact card after activating the first communication means, the near field communication control means stops operating the first communication means and does not activate the first communication means until the amount of incoming light exceeds the threshold value.

3. The communication apparatus according to claim 1 or 2, further comprising a second communication means transmits information acquired from the non-contact card to another apparatus.

4. The communication apparatus according to claim 3, wherein when receiving a predetermined activation signal from the another apparatus via the second communication means, the near field communication control means activates the first communication means.

5. A communication apparatus comprising:
   an antenna;
   a first communication unit configured to perform near field communication with a non-contact card via the antenna;
   a photodetecting unit provided near the antenna and configured to detect an amount of incoming light; and
   a near field communication control unit configured to activate the first communication unit when the amount of incoming light becomes less than a predetermined threshold value,
   the communication apparatus being driven by a battery; and
   wherein the photodetecting unit includes a photovoltaic power generating panel to convert incoming light to power to charge the battery therewith.

* * * * *